United States Patent
Kaneko et al.

(10) Patent No.: US 8,027,001 B2
(45) Date of Patent: Sep. 27, 2011

(54) LIQUID CRYSTAL DISPLAY DEVICE WITH DOUBLE LAYERED REFLECTOR IN PIXEL

(75) Inventors: Toshiki Kaneko, Chiba (JP); Toshiyuki Matsuura, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 716 days.

(21) Appl. No.: 11/678,138

(22) Filed: Feb. 23, 2007

(65) Prior Publication Data
US 2007/0200985 A1    Aug. 30, 2007

(30) Foreign Application Priority Data
Feb. 24, 2006   (JP) .................... 2006-047666

(51) Int. Cl.
G02F 1/1335    (2006.01)
G02F 1/1343    (2006.01)
(52) U.S. Cl. ......... 349/114; 349/113; 349/143; 349/147
(58) Field of Classification Search .......... 349/114, 349/113, 143, 146
See application file for complete search history.

(56) References Cited

U.S. PATENT DOCUMENTS

| | | | | |
|---|---|---|---|---|
| 6,980,268 B2 * | 12/2005 | You | | 349/113 |
| 7,064,799 B2 * | 6/2006 | Okamoto et al. | | 349/114 |
| 7,075,603 B2 * | 7/2006 | Ihida et al. | | 349/114 |
| 2003/0112213 A1 | 6/2003 | Noguchi et al. | | |
| 2004/0004686 A1 * | 1/2004 | Ogawa et al. | | 349/114 |
| 2004/0021813 A1 * | 2/2004 | Kim et al. | | 349/113 |

FOREIGN PATENT DOCUMENTS

| | | |
|---|---|---|
| JP | 2003-315766 | 11/2003 |
| JP | 2005-84248 | 3/2005 |

\* cited by examiner

*Primary Examiner* — Hoan C Nguyen
(74) *Attorney, Agent, or Firm* — Antonelli, Terry, Stout & Kraus, LLP.

(57) ABSTRACT

The present invention provides a transflective liquid crystal display device which can reduce the generation of an image retention even when the transflective liquid crystal display device adopts the constitution in which an aluminum film is formed in a reflective region and a transparent conductive film made of ITO or the like is arranged over the aluminum film. The constitution according to the present invention is characterized in that, in a liquid crystal display device which includes a transmissive region and a reflective region within one pixel, a pixel electrode of the transmissive region is formed of a first transparent conductive film, a pixel electrode of the reflective region is formed by stacking an aluminum film on a high-melting-point metal film and by arranging a second transparent conductive film on the aluminum film, and the second conductive film and the high-melting-point metal film in the reflective region are brought into contact with each other at an end portion of the high-melting-point metal film.

17 Claims, 6 Drawing Sheets

LIQUID CRYSTAL DISPLAY DEVICE WITH DOUBLE LAYERED REFLECTOR IN PIXEL

CROSS-REFERENCE TO RELATED APPLICATIONS

The disclosure of Japanese Patent Application No. 2006-47666 filed on Feb. 24, 2006 including the specification, drawings and abstract is incorporated herein by reference in its entirety.

BACKGROUND

1. Field of the Invention

The present invention relates to a transflective liquid crystal display device, and more particularly to a transflective liquid crystal display device which arranges a transmissive region and a reflective region on a pixel part thereof.

2. Description of the Related Arts

As an active matrix type liquid crystal display device currently on a main stream, a reflective liquid crystal display device, a transmissive liquid crystal display device, and a semi transmissive and semi reflective liquid crystal display device (hereinafter, referred to as a transflective liquid crystal display device) which combines the reflective liquid crystal display device and the transmissive liquid crystal display device have been known. The transflective liquid crystal display device realizes advantages of the transmissive liquid crystal display device and the reflective liquid crystal display device using one liquid crystal display device by providing a transmissive region which allows the transmission of light from a back light and a reflective region which allows the reflection of an external light on a pixel part.

Figure 5:
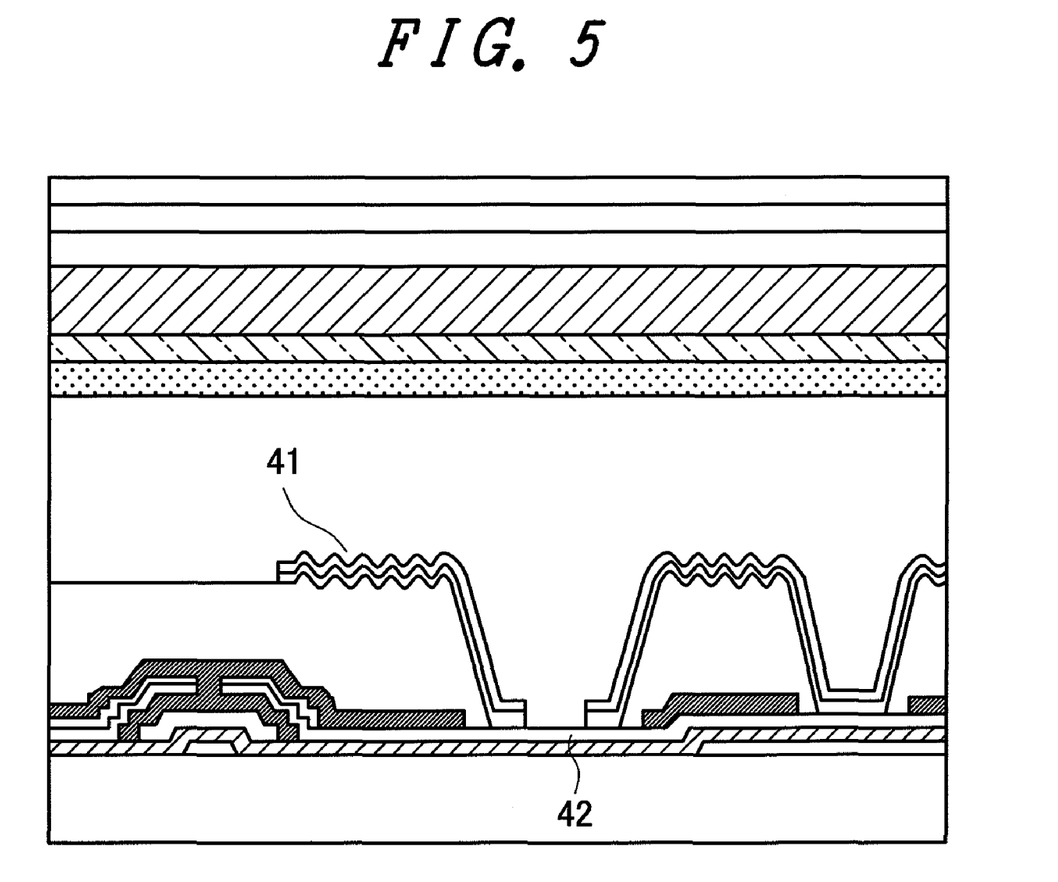
FIG. 5 is a view showing the constitution of a transflective liquid crystal display device of a related art.

Japanese Patent Laid-Open No. 2003-315766 (patent document 1), as shown in FIG. 5, shows a cross-section of a pixel part of a so-called transflective liquid crystal display device, wherein a metal reflective film 41 (constituted by forming an Al film on a Mo film) is arranged as a pixel electrode of a reflective region, and an ITO layer 42 is arranged as a pixel electrode of a transmissive region.

Figure 6:
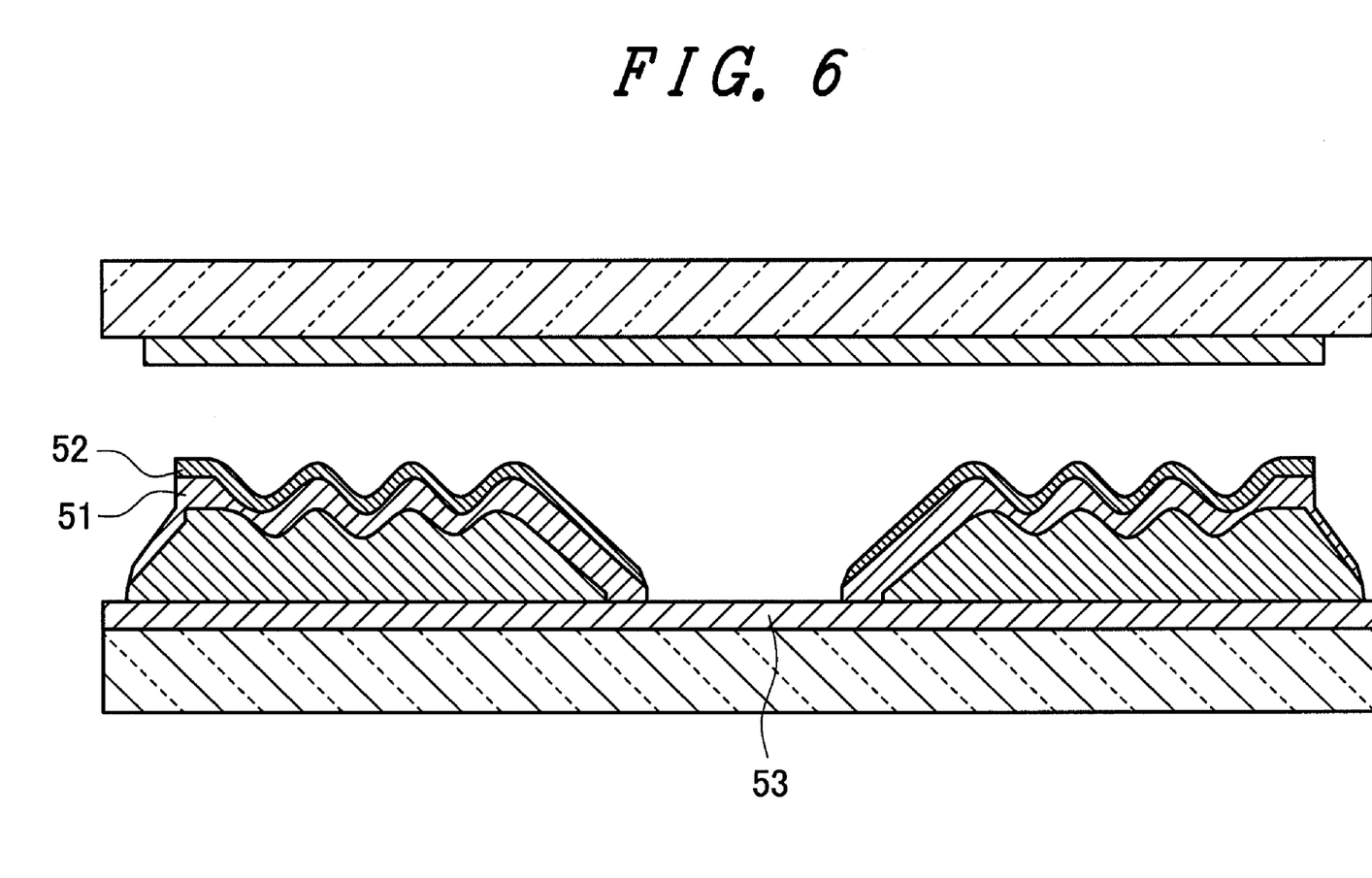
FIG. 6 is a view showing the constitution of a transflective liquid crystal display device of a related art.

Further, in patent document 1, as a countermeasure to cope with flickers which are conspicuously observed particularly when the transflective liquid crystal display device is driven with low frequency, as shown in FIG. 6, there is described the constitution which covers a surface of a reflective electrode 51 (Al) arranged in a reflective region with an amorphous transparent conductive film 52 made of InZnOx (oxide mainly containing indium oxide ($In_2O_3$) and zinc oxide (ZnO), work function: approximately 4.8 eV). Here, numeral 53 in FIG. 6 indicates an ITO film which constitutes a transmissive region. Usually, a work function of aluminum is 4.06 eV and a work function of ITO is 4.41 eV and hence, common potentials of the reflective region and the transmissive region are shifted from each other by approximately 0.4 V whereby flickers are generated. In the above-mentioned constitution, to suppress of the generation of the flickers, the ITO film is also arranged in the reflective region so as to make the work functions equal to each other thus eliminating the difference between the common potentials.

Aluminum described in patent document 1 is favorably used as metal for forming the reflective electrode. However, when aluminum is used as metal for forming the reflective electrode, the compatibility of the aluminum film with the transparent conductive film made of ITO or the like which is arranged over the aluminum film has to be taken into consideration. It is found that the constitution which arranges the ITO film on the aluminum film has a drawback that aluminum oxide is formed on an interface between the aluminum film and the ITO film due to electrical conductance therebetween and a charge is stored in the interface thus generating an image retention. Further, it is also found that such a constitution brings about not only the drawback on the generation of image retention but also a possibility that the electrical conductance is not achieved on the interface between the aluminum film and the ITO film and hence, the ITO film loses a function of an electrode whereby the difference in work functions is generated between the ITO film and an ITO film which is arranged in the transmissive region.

To cope with such drawbacks, it may be possible to arrange an ITO film having a small film thickness (for example, 30 μm or less). However, with such a thin ITO film, there exists a possibility of disconnection of the ITO film at a broken-step portion of a through hole which connects a transistor and a pixel electrode and hence, the countermeasure is not effective.

The present invention has been made to overcome such drawbacks, and it is an object of the present invention to provide a transflective liquid crystal display device which can reduce the generation of an image retention even when the transflective liquid crystal display device adopts the constitution in which an aluminum film is formed in a reflective region and a transparent conductive film made of ITO or the like is arranged over the aluminum film.

SUMMARY

According to one aspect of the present invention, in a liquid crystal display device which includes a transmissive region and a reflective region within one pixel, a pixel electrode of the transmissive region is formed of a first transparent conductive film, a pixel electrode of the reflective region is formed by stacking an aluminum film on a high-melting-point metal film and by arranging a second transparent conductive film on the aluminum film, and the second conductive film and the high-melting-point metal film in the reflective region are brought into contact with each other at an end portion of the high-melting-point metal film.

Due to such a constitution, the present invention can provide the transflective liquid crystal display device which reduces the generation of image retention.

The high-melting-point metal film may be made of molybdenum, for example, while the first transparent conductive film and the second transparent conductive film may be made of any one of ITO, IZO and IGO. Here, although the first transparent conductive film and the second transparent conductive film are differently named, these names imply the transparent conductive film arranged in the transmissive region and the transparent conductive film arranged in the reflective region, and the transparent conductive film arranged in the transmissive region and the transparent conductive film arranged in the reflective region may be formed using the same step.

To describe the constitution of one aspect of the invention in detail, the liquid crystal display device is constituted of one substrate, another substrate and liquid crystal sandwiched between the one substrate and another substrate. One pixel is configured corresponding to a region which is surrounded by a plurality of scanning signal lines which are arranged over one substrate and a plurality of video signal lines which are arranged over one substrate in a state that video signal lines intersect the plurality of scanning signal lines. One pixel includes a switching element (for example, a thin film transistor) which is connected to the scanning signal line, an inorganic insulation film which is arranged over the switching element, and an organic protective film which is arranged over the inorganic insulation film. The high-melting-point metal film and the switching element are connected with each other via a contact hole formed in the organic protective film and the inorganic insulation film.

The high-melting-point metal film is connected with the first transparent conductive film in the transmissive region at an end portion thereof where the reflective region and the transmissive region abut each other.

According to another aspect of the present invention, in a liquid crystal display device which includes a transmissive region and a reflective region within one pixel, a pixel electrode of the transmissive region is formed of a first transparent conductive film, a pixel electrode of the reflective region is formed by stacking an aluminum film on a high-melting-point metal film and by arranging an aluminum nitride film on the aluminum film, and by arranging a second transparent conductive film on the aluminum nitride film and the second transparent conductive film and the high-melting-point metal film in the reflective region are brought into contact with each other at an end portion of the high-melting-point metal film.

The high-melting-point metal film may be made of molybdenum, for example, while the first transparent conductive film and the second transparent conductive film may be made of any one of ITO, IZO and IGO. Here, although the first transparent conductive film and the second transparent conductive film are differently named, these names imply the transparent conductive film arranged in the transmissive region and the transparent conductive film arranged in the reflective region, and the transparent conductive film arranged in the transmissive region and the transparent conductive film arranged in the reflective region may be formed using the same step.

To describe the constitution of one aspect of the invention in detail, the liquid crystal display device is constituted of one substrate, another substrate and liquid crystal sandwiched between the one substrate and another substrate. One pixel is configured corresponding to a region which is surrounded by a plurality of scanning signal lines which are arranged over one substrate and a plurality of video signal lines which are arranged over one substrate in a state that the video signal lines intersect the plurality of scanning signal lines. One pixel includes a switching element (for example, a thin film transistor) which is connected to the scanning signal line, an inorganic insulation film which is arranged over the switching element, and an organic protective film which is arranged over the inorganic insulation film. The high-melting-point metal film and the switching element are connected with each other via a contact hole formed in the organic protective film and the inorganic insulation film.

The high-melting-point metal film is also connected with the first transparent conductive film in the transmissive region at an end portion thereof where the reflective region and the transmissive region abut each other.

According to the present invention, due to such constitutions, it is possible to provide the transflective liquid crystal display device which reduces the generation of an image retention.

DETAILED DESCRIPTION OF THE INVENTION

Hereinafter, several embodiments of the present invention are explained in detail in conjunction with drawings showing the embodiments.

Embodiment 1

Figure 1:
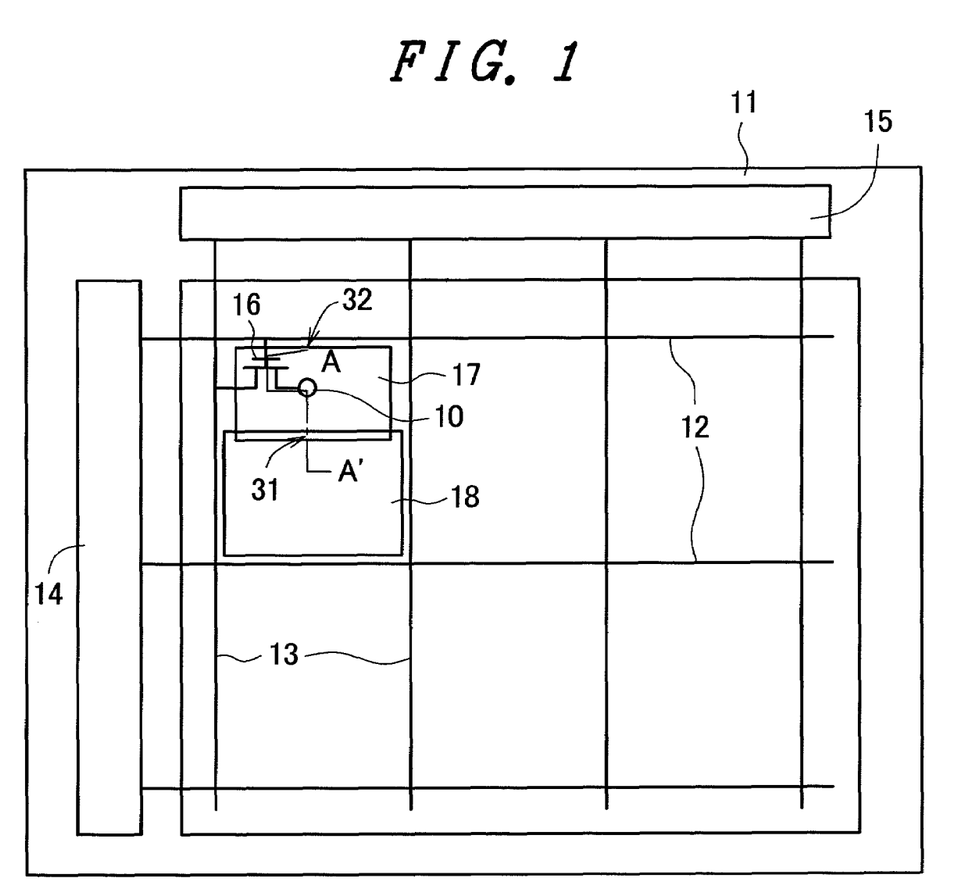
FIG. 1 is a view showing the constitution of a transflective liquid crystal display device of the present invention.

FIG. 1 is a view showing the constitution of a transflective liquid crystal display device of the present invention.

A plurality of scanning lines 12 and a plurality of signal lines 13 which is arranged to intersect the scanning lines 12 are arranged over a substrate 11. Further, pixels are formed corresponding to regions which are surrounded by the scanning lines 12 and the signal lines 13 and a display region is formed of a plurality of these pixels. Further, the scanning lines 12 are connected to a scanning drive circuit 14 for controlling the driving of the scanning lines 12 which is arranged outside the display region, while the signal lines 13 are connected to a signal drive circuit 15 for controlling the driving of the signal lines 13 which is also arranged outside the display region. Here, the scanning drive circuit 14 may be constituted of one semiconductor element or a plurality of semiconductor elements. Also the signal drive circuit 15 may be constituted in the same manner as the scanning drive circuit 14. Further, the scanning drive circuit 14 and the signal drive circuit 15 may be constituted of one semiconductor element.

In each pixel, a switching element 16 such as a thin film transistor (hereinafter, referred to as a TFT) is arranged corresponding to an intersecting portion of the scanning line 12 and the signal line 13. A pixel electrode of a reflective region 17 is connected to the switching element 16, and a pixel electrode of a transmissive region 18 is connected to the pixel electrode of the reflective region 17. Since the substrate 11 constitutes a substrate on which the TFTs constituting the switching elements are arranged, the substrate 11 is also referred to as a TFT substrate.

Figure 2:
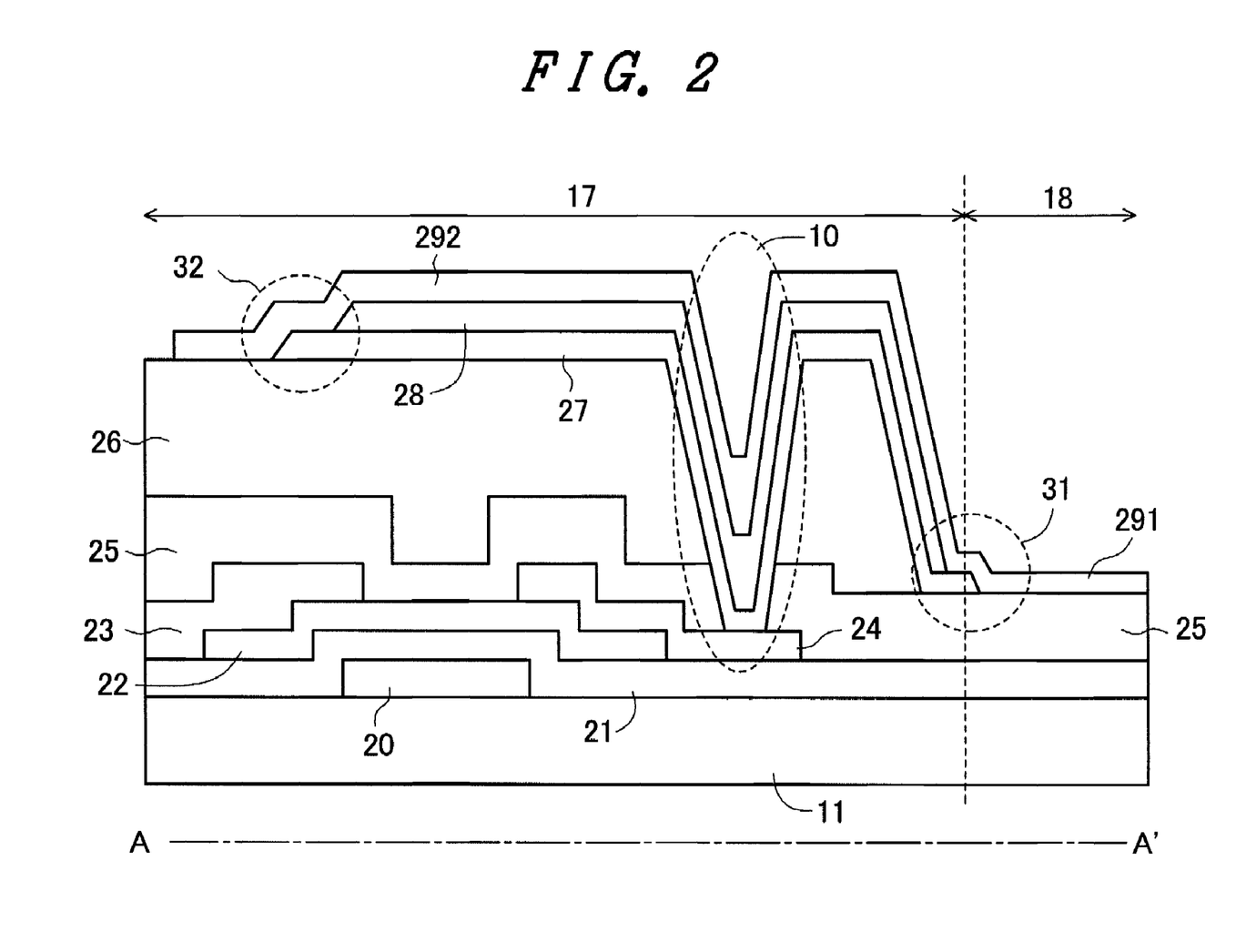
FIG. 2 is a cross-sectional view taken along a line A-A' in FIG. 1.

FIG. 2 is a cross-sectional view taken along a line A-A' in FIG. 1. Here, although it is not shown in the drawing, a back light device is arranged below a liquid crystal display panel in FIG. 2, and the liquid crystal display device is configures such that light from the back light passes through the transmissive region 18 from below.

On the substrate 11 shown in FIG. 2, a first transparent conductive film 291 made of ITO or the like which constitutes the transmissive region 18 is arranged. The first transparent conductive film 291 is arranged in a boundary portion 31 between the transmissive region 18 and the reflective region 17 in a state that the first transparent conductive film 291 is placed on a high-melting-point metal film 27 which is arranged on a reflective region 17 side.

In the reflective region 17 which is arranged over the substrate 11, gate electrodes 20 which are connected to the scanning lines 12, a gate insulation film 21 which is arranged over the gate electrodes 20, and the thin film transistors 16 each of which is constituted of a semiconductor layer 22 arranged over the gate insulation film 21, a drain electrode 23 which is arranged over the semiconductor layer 22 and is connected to the signal line 13 and a source electrode 24 connected to the pixel electrode of the reflective region 17 are arranged. Further, on the thin film transistors 16, an inorganic insulation film 25 made of silicon nitride (SiN), for example, and an organic protective film 26 made of an epoxy resin, for example, which is arranged over the inorganic insulation film 25 are arranged.

Further, the pixel electrode of the reflective region 17 is arranged over the organic protective film 26.

Hereinafter, the pixel electrode of the reflective region 17 is explained in detail.

In the present invention, the pixel electrode of the reflective region 17 is formed by stacking the high-melting-point metal film 27, an aluminum film 28 and transparent conductive film 29 made of ITO in order from an organic protective film 26 side. The high-melting-point metal film 27 of the present invention may be, for example, chromium, molybdenum, tungsten titanium or alloy containing any one of chromium, molybdenum, tungsten titanium or alloy containing any one of these metals.

[Explanation of the Constitution of an End Portion 31 in the Reflective Region 17]

The constitution of the end portion 31 in the reflective region 17 is explained.

The present invention is characterized in that, at an end portion 31 of the reflective region 17, the high-melting-point metal film 27 which constitutes a lowermost layer is connected with the transparent conductive film 29 which is formed on the high-melting-point metal film 27. Due to such a constitution, the high-melting-point metal film 27 and the transparent conductive film 29 having a good ohmic contact are connected with each other at the end portion 31. Accordingly, even when the electrical connection or conduction is not established between the aluminum film 28 on the high-melting-point metal film 27 and the transparent conductive film 29 arranged over the aluminum film 28 on an interface therebetween, the transparent conductive film 29 is conductive with the high-melting-point metal film 27 and hence, there is no possibility that the transparent conductive film 29 loses a function of an electrode whereby it is possible to provide the transflective liquid crystal display device which can reduce the generation of an image retention.

[Explanation of the Constitution of a Boundary Portion 32 Between the Reflective Region 17 and the Transmissive Region 18]

The constitution of the boundary portion 32 between the reflective region 17 and the transmissive region 18 is explained hereinafter.

The present invention is characterized in that the high-melting-point metal film 27 and the aluminum film 28 which are arranged in the reflective region 17 are formed such that the high-melting-point metal film 27 and the aluminum film 28 extend to the boundary portion 32 between the reflective region 17 and the transmissive region 18 and, at the same time, a transparent conductive film (a first transparent conductive film) which constitutes the pixel electrode arranged in the transmissive region 18 is formed in a state that the transparent conductive film is placed on the high-melting-point metal film 27 which extends from the reflective region 17.

Due to such a constitution, the high-melting-point metal film 27 and the transparent conductive film having a good ohmic contact can be connected with each other also at the boundary portion 32. Here, the transparent conductive film 291 arranged in the transmissive region and the transparent conductive film 292 arranged in the reflective region can be formed using the same step and hence, it is possible to form the transparent conductive film without increasing the number of steps. In this embodiment of the present invention, for the sake of convenience, the explanation has been made by using the transparent conductive film arranged in the reflective region 17 as the transparent conductive film 292 (a second transparent conductive film) and the transparent conductive film arranged in the transmissive region 18 as the transparent conductive film 291 (a first transparent conductive film). However, it is needless to say that when the transparent conductive films 291, 292 are formed using the same step, the transparent conductive films 291, 292 are formed into an integrally-formed transparent conductive film.

[Explanation of the Constitution of a Contact Hole Portion 10 Formed in the Reflective Region 17]

The constitution of the contact hole portion 10 formed in the reflective region 17 is explained hereinafter.

According to the present invention, a switching element such as a thin film transistor and the pixel electrode are connected to each other in the reflective region 17.

The high-melting-point metal film 27 of the pixel electrode arranged in the reflective region 17 is connected with a source electrode 24 of the thin film transistor via a contact hole portion 10 which is formed in the inorganic insulation film 25 and the organic protective film 26. As a matter of course, also in the contact hole portion 10, the aluminum film 28 and the transparent conductive film 29 are arranged over the high-melting-point metal film 27 in a stacked manner.

Here, as aluminum used in the present invention, it may be possible to use aluminum alloy such as Al—Nd alloy beside pure aluminum.

Embodiment 2

Figure 3:
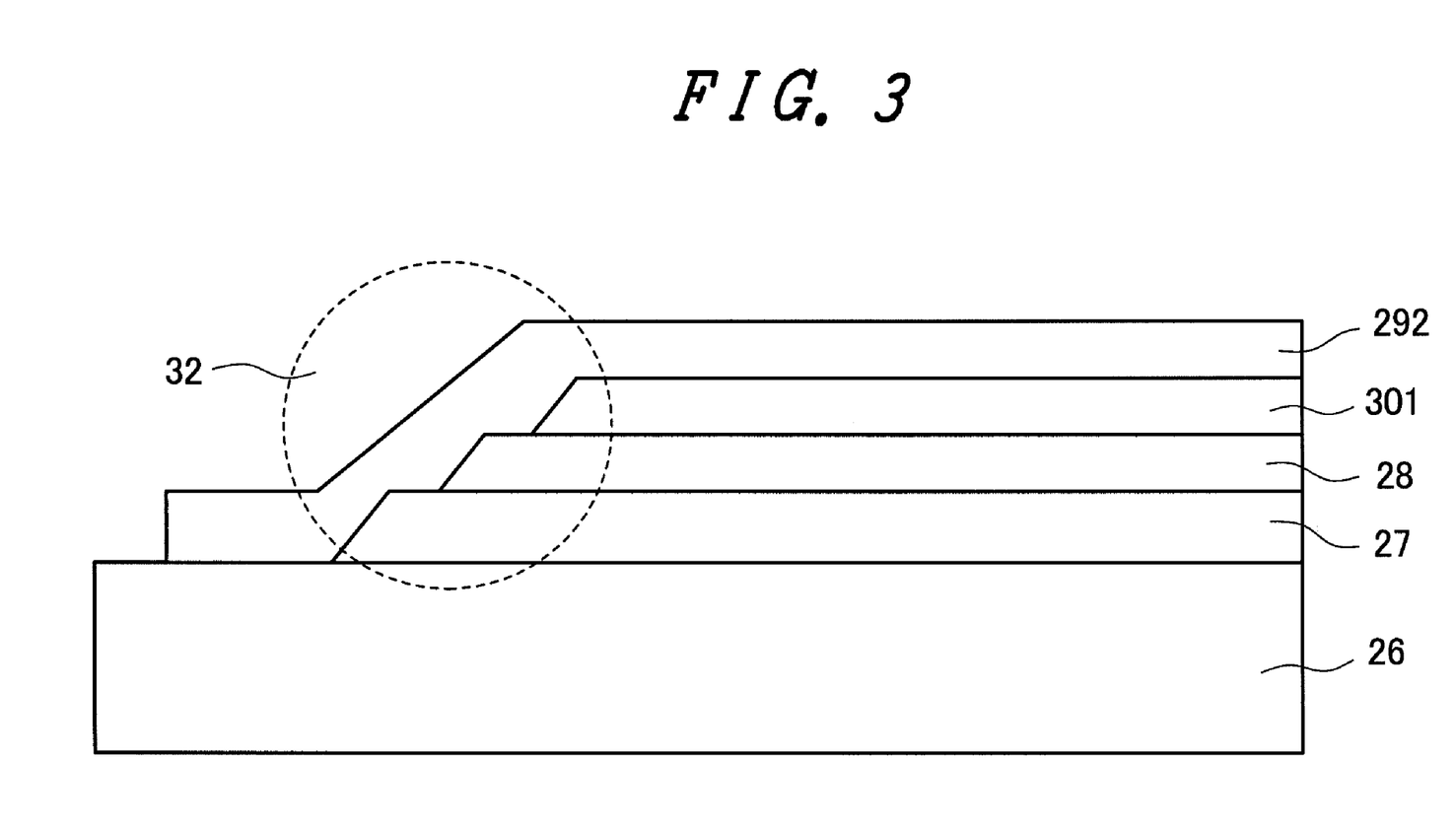
FIG. 3 is a view showing another embodiment of the present invention.

FIG. 3 is a view showing an embodiment 2 of the present invention.

FIG. 3 is a view showing an end portion 32 of a reflective region 17 corresponding to FIG. 2. As shown in FIG. 3, in this embodiment, pixel electrodes are formed on an organic protective film 26 and each pixel electrode is constituted of a high-melting-point metal film 27, an aluminum film 28, an aluminum nitride (AlN) film 301 which is arranged over the aluminum film 28, and a second transparent conductive film 292 which is arranged over the aluminum nitride film 301. Also due to such a constitution, the high-melting-point metal film 27 is connected with the second transparent conductive film 292 at the end portion 32 and hence, it is possible to obtain the same advantageous effects as the advantageous effects of the embodiment 1. AlN and ITO exhibit low connection resistances and hence, it is possible to further lower the connection resistance compared to the connection resistance of the connection at the end portion.

Embodiment 3

Next, an embodiment 3 of the present invention is explained.

Figure 4:
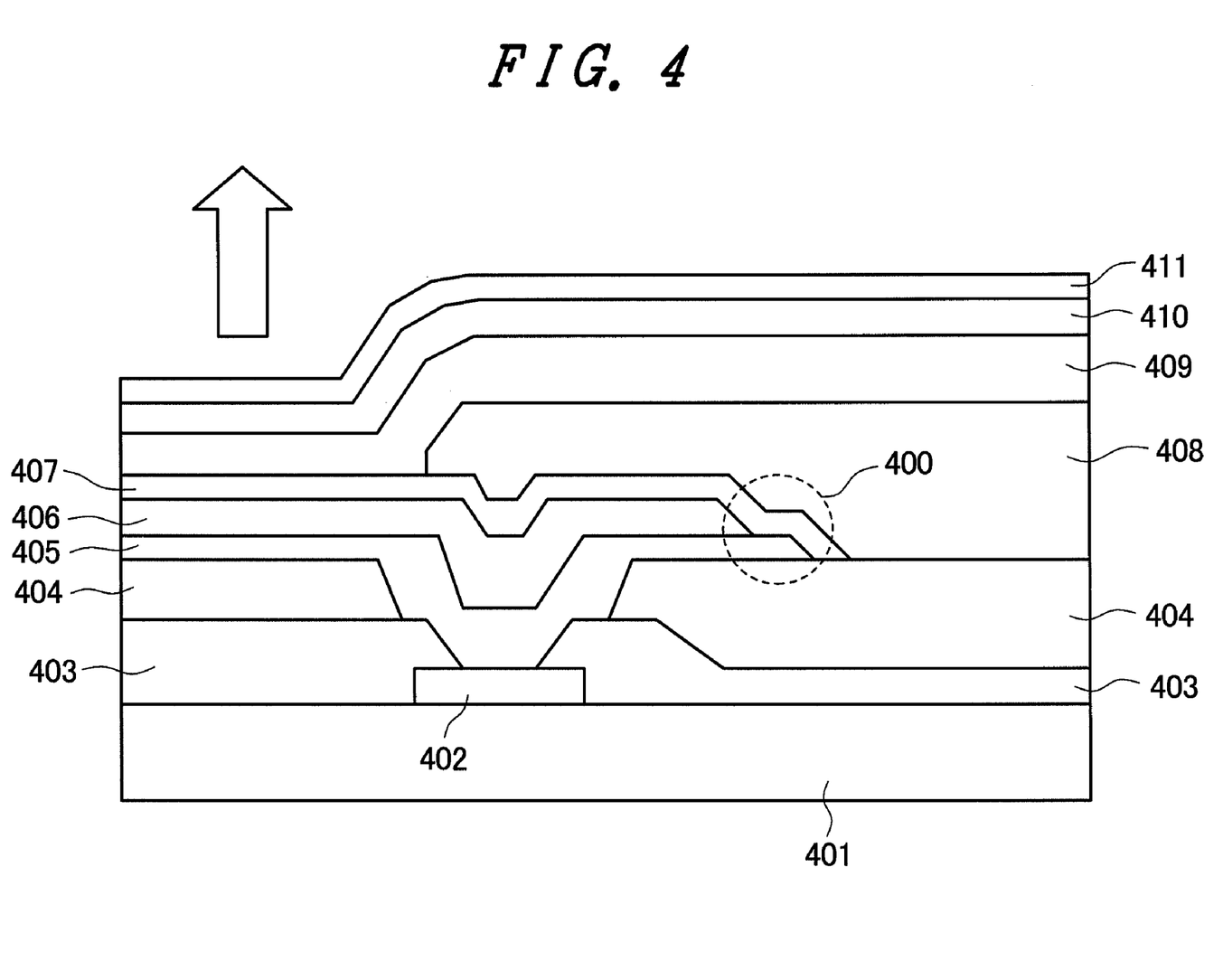
FIG. 4 is a view showing still another embodiment of the present invention.

FIG. 4 is a view for explaining the embodiment 3 and shows a case in which the present invention is applied to a cathode electrode of a top-emission-type OLED. In the top emission type OLED, to radiate emitted light toward a face surface from a device, a reflective film becomes necessary. On the other hand, it is preferable to arrange the ITO film below an electron transport layer and hence, it is preferable to adopt the stacked structure constituted of an aluminum film and an ITO film in which the ITO film is formed on the aluminum film.

Although the source electrode and the ITO electrode can be brought into contact with each other via through hole having a large broken step formed in a leveling film having a large thickness, to prevent the generation of disconnection attributed to the large broken step, it is necessary to increase a thickness of the ITO film. However, to maintain the same transmissivity with respect to wavelengths of three primary colors, it is necessary to set the thickness of the ITO film to approximately 30 nm.

Due to such reasons, it is impossible to bring the thin ITO film formed of a single layer in contact with the source electrode and hence, it is necessary to stack any metal layer on the ITO film. Further, the metal layer is required to perform a reflection function.

Accordingly, in this embodiment, by particularly increasing one step which brings an ITO film and a high-melting-point metal film which is pulled around from the source electrode into contact with each other at an end portion, it is no more necessary to expose a film surface which is brought into contact with the ITO film.

In FIG. 4, source electrodes 402 for switching thin film transistors or the like is arranged over a substrate 401, an inorganic insulation film 403 and a leveling film 404 are arranged over the source electrodes 402, and an inorganic insulation film 403 and a flatting film 404 are arranged over the source electrodes 401. The inorganic insulation film 403 and the flatting film 404 are connected with a high-melting-point metal film 405 (for example, made of molybdenum-tungsten alloy) and an aluminum alloy film (for example, made of AlSi) which constitutes a reflection layer via a contact hole. An ITO film 407 is arranged over the aluminum alloy film 406. This embodiment is characterized in that the ITO film 407 and the high-melting-point metal film 405 are brought into contact with each other at an end potion 400 of the high-melting-point metal film 405. Here, numeral 408 indicates a bank provided for separating pixel electrodes.

After the bank is formed, an organic layer 409 is formed by a vapor deposition method. The organic layer is constituted by stacking an electron transport layer, a light emission layer and a hole transport layer from below. Further, a vanadium pentoxide layer ($V_2O_5$) 410 is formed for preventing the generation of a sputter damage. Finally, a transparent conductive layer (ITO) 411 is formed by sputtering thus forming an OLED having the top emission structure which emits light from pixel regions which are separated from each other by the bank.

What is claimed is:

1. A liquid crystal display device including a transmissive region and a reflective region within each pixel, wherein
a pixel electrode arranged in the transmissive region is constituted of a first transparent conductive film,
a pixel electrode arranged in the reflective region is constituted by stacking at least one member including at least an aluminum film or an aluminum alloy film on a high-melting-point metal so that the high-melting-point metal has at least an exposed end portion with an exposed upper surface thereat which extends beyond the aluminum film or the aluminum alloy film stacked thereon, and arranging a second transparent conductive film over the aluminum film or the aluminum alloy film, and
the second transparent conductive film and the high-melting-point metal in the reflective region are brought into contact with each other at the exposed end portion of the high-melting-point metal at at least the exposed upper surface thereof.

2. A liquid crystal display device according to claim 1, wherein the high-melting-point metal is any one of chromium, molybdenum, tungsten, titanium and alloy containing any one of chromium, molybdenum, tungsten, titanium.

3. A liquid crystal display device according to claim 1, wherein the first transparent conductive film and the second transparent conductive film are made of any one of ITO, IZO or IGO.

4. A liquid crystal display device according to claim 3, wherein the first transparent conductive film and the second transparent conductive film are formed using the same step.

5. A liquid crystal display device according to claim 1, wherein the liquid crystal display device is constituted of one substrate, another substrate and liquid crystal sandwiched between one substrate and another substrate,
one pixel is configured corresponding to a region which is surrounded by a plurality of scanning signal lines which are arranged over one substrate and a plurality of video signal lines which are arranged over one substrate in a state that video signal lines intersect the plurality of scanning signal lines,
one pixel includes a switching element which is connected to the scanning signal line, an inorganic insulation film which is arranged over the switching element, and an organic protective film which is arranged over the inorganic insulation film, and
the high-melting-point metal film and the switching element are connected with each other via a contact hole formed in the organic protective film and the inorganic insulation film.

6. A liquid crystal display device according to claim 5, wherein the high-melting-point metal film is connected with the first transparent conductive film in the transmissive region at another end portion thereof where the reflective region and the transmissive region abut each other.

7. A liquid crystal display device according to claim 1, wherein the second transparent conductive film is arranged on an exposed end edge portion of the exposed end portion of the high-melting-point metal so that the second transparent conductive film and the high-melting-point metal in the reflective region are brought into contact with each other thereat.

8. A liquid crystal display device according to claim 1, wherein the second transparent conductive film is arranged directly on the aluminum film or the aluminum alloy film and on an exposed end edge portion of the exposed end portion of the high-melting-point metal in the reflective region proximate to the transmissive region so that the transparent conductive film and the high-melting-point metal in the reflective region are brought into contact with other at the exposed end edge portion of the high-melting-point metal.

9. A liquid crystal display device according to claim 1, wherein the second transparent conductive film is arranged on an exposed end edge portion of the exposed end portion of the high-melting-point metal in the reflective region proximate to the transmissive region so that the second transparent conductive film and the high-melting-point metal in the reflective region are brought into contact with each other at the exposed end edge portion of the high-melting-point metal to enable reduction of generation of image retention by the liquid crystal display device.

10. A liquid crystal display device according to claim 9, wherein the second transparent conductive film is arranged directly on the aluminum film or the aluminum alloy film and directly on the exposed end edge portion of the high-melting-point metal.

11. A liquid crystal display device according to claim 1, wherein the second transparent conductive film is arranged on the aluminum film or the aluminum alloy film.

12. A liquid crystal display device, wherein
the liquid crystal display device includes a transmissive region and a reflective region within one pixel, a pixel electrode of the transmissive region is formed of a first transparent conductive film, a pixel electrode of the reflective region is formed by stacking an aluminum film or an aluminum alloy film on a high-melting-point metal film so that the high-melting-point metal film has at least an exposed end portion with an exposed upper surface thereat which extends beyond the aluminum film or the aluminum alloy film stacked thereon, and by arranging an aluminum nitride film on the aluminum film or the aluminum alloy film, and by arranging a second transparent conductive film on the aluminum nitride film, and the second transparent conductive film and the high-melting-point metal film in the reflective region are brought into contact with each other at the exposed end portion of the high-melting-point metal film at at least the exposed upper surface thereof.

13. A liquid crystal display device according to claim 12, wherein the high-melting-point metal film is any one of chromium, molybdenum, tungsten, titanium and alloy containing any one of chromium, molybdenum, tungsten, titanium.

14. A liquid crystal display device according to claim 12, wherein the first transparent conductive film and the second transparent conductive film are made of any one of ITO, IZO or IGO.

15. A liquid crystal display device according to claim 14, wherein the first transparent conductive film and the second transparent conductive film are formed using the same step.

16. A liquid crystal display device according to claim 12, wherein the liquid crystal display device is constituted of one substrate, another substrate and liquid crystal sandwiched between the one substrate and another substrate, one pixel is configured corresponding to a region which is surrounded by a plurality of scanning signal lines which are arranged over one substrate and a plurality of video signal lines which are arranged over one substrate in a state that the plurality of video signal lines intersect the plurality of scanning signal lines, one pixel includes a switching element which is connected to the scanning signal line, an inorganic insulation film which is arranged over the switching element, and an organic protective film which is arranged over the inorganic insulation film, and the high-melting-point metal film and the switching element are connected with each other via a contact hole formed in the organic protective film and the inorganic insulation film.

17. A liquid crystal display device according to claim 16, wherein the high-melting-point metal film is connected with the first transparent conductive film in the transmissive region at another end portion thereof where the reflective region and the transmissive region about each other.

* * * * *